Aug. 1, 1944.                P. E. NOKES                2,354,768
                          ELECTRICAL COUNTER
                  Filed Aug. 25, 1941        2 Sheets—Sheet 1

INVENTOR
Philip E. Nokes
By his attorney

Aug. 1, 1944.   P. E. NOKES   2,354,768
ELECTRICAL COUNTER
Filed Aug. 25, 1941   2 Sheets-Sheet 2

INVENTOR
Philip E. Nokes
By his attorney

Patented Aug. 1, 1944

2,354,768

UNITED STATES PATENT OFFICE 2,354,768

ELECTRICAL COUNTER

Philip E. Nokes, Beverly, Mass., assignor to United Shoe Machinery Corporation, Flemington, N. J., a corporation of New Jersey Application August 25, 1941, Serial No. 408,229

6 Claims. (Cl. 235—92)

This invention relates to high-speed counters which are operated electrically and is herein disclosed as embodying electronic tube circuits by means of which the operation of a mechanical counter is effected at leisure after the measuring operation has been completed.

In counting a series of events which take place in rapid sequence, it frequently occurs, especially where these events involve electrical or optical apparatus, that mechanical counters cannot be operated with sufficient rapidity for practical use for the purpose of registering the total number of events counted. Even if it were desired to use one of the simplest counters such as those operated by a pawl and ratchet mechanism, the mechanical inertia of the parts would render it impractical or impossible to employ such a device for high-speed counting. For example, a number of area-measuring machines have been devised which employ a scanning apparatus to deliver a series of light beams to a photocell. If, however, the area measurement is to be done rapidly enough to be commercially satisfactory, the number of light beams or flashes delivered to the photocell in a unit of time will be very large and, consequently, a mechanical counter cannot be actuated directly from the photocell at such a speed, even with an interposed amplifier.

An object of the present invention is to provide an improved high-speed counter which can be operated electrically and which may be arranged to measure the total number of a series of events the frequency of which is well beyond the range of mechanical operations.

In accordance with a feature of the invention, an accumulator condenser is provided, in which is stored a series of unit quantities of electrons which is in direct proportion to the count which has been made. Then, after the completion of the count, the stored-up energy is measured automatically and the measurement transferred to a mechanically operated counter. As herein illustrated, the unit quantities of electrons are unit charges of electrical energy and these are delivered to an accumulating condenser, one charge for each impulse derived from the reception of a light beam by a photocell. The charging of the accumulating condenser is effected by the use of a saw-tooth oscillator circuit employing an arc-discharge tube.

Measurement of the stored-up energy in the accumulating condenser is effected, in accordance with a feature of the invention, by discharging the condenser through another saw-tooth or relaxation oscillator circuit which includes a device for operating the mechanical counter. As noted above, this discharge of the condenser and measurement of its contents can take place after the original measurement has been completed, and can be slow enough to overcome the mechanical inertia of the counters or registers. Actually, it will be very fast.

For greater convenience, a plurality of accumulating condensers are employed which are in parallel circuits and hence are charged simultaneously with equal amounts. These condensers are associated with individual counters, one for each of the digits of the anticipated count. Still another feature of the invention resides in an electrical arrangement for automatically discharging certain of these condensers at intervals which are determined by the represented digit and the associated counter. For example, the accumulating condenser associated with the unit digit will be discharged automatically whenever 10 units have been received, and the condenser associated with the tens digit will be discharged whenever one hundred units have been received. Inasmuch as the same number of unit charges is delivered to each of the condensers, this automatic filling and discharging of those representing the lower digits results in leaving within each of the accumulating condensers, at the end of the count, a residual charge the measurement of which requires the registering of less than 10 quantums of the size corresponding to the digit which is to be represented and is effected by utilization of a relaxation oscillator circuit as mentioned above.

These and other features of the invention will best be understood from a consideration of the following description taken in connection with the accompanying drawings, in which Fig. 1 is a circuit diagram of the electronic apparatus employed for registering a number of light beams received by a photocell;

Figures 1, 2:
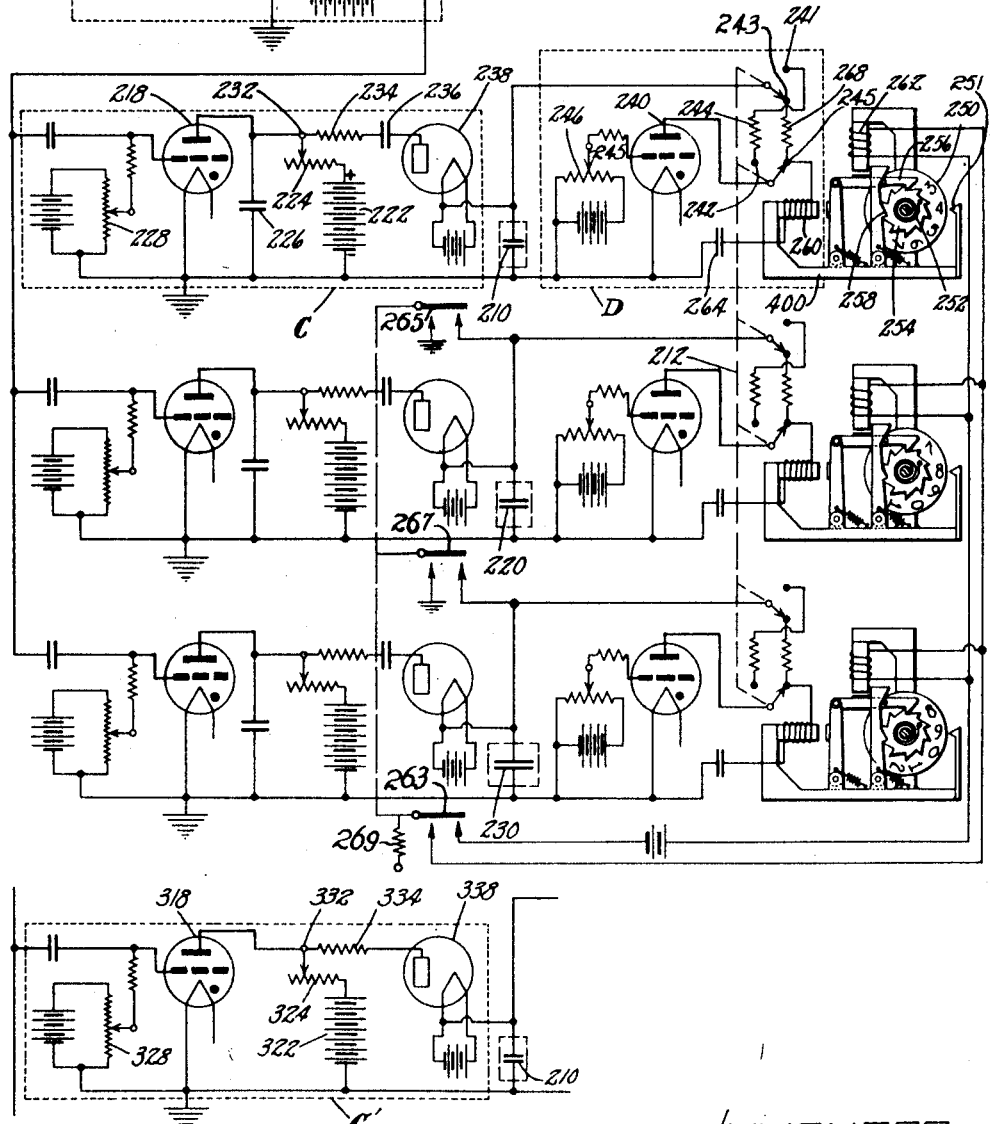
Fig. 2 is a diagram of an alternative arrangement of the charging portion of this circuit.

It will be assumed that the number of events to be counted corresponds to the number of a series of light beams or flashes delivered to a photocell 28. In area-measuring machines, for example, the delivery of a light beam is effected by a scanning apparatus and is dependent upon either the presence or the absence, in a predetermined path, of an article the area of which is to be measured. The resulting area is then determined by counting the number of light beams. The delivery of such beams, however, as by a scanning apparatus, is very rapid and the difficulty of mechanically counting such a series is overcome herein by an electrical arrangement in which the accumulating and carrying over usually performed mechanically is done electrically, requiring only the final setting of a group of independent figure wheels 250 to be done mechanically. This allows the setting of the figure wheels to be done after the scanning device has finished the measuring of a particular piece of work and, as a result, more time may be allowed for the mechanical operation of the figure wheels which, as will be later described, are not required in any case to move more than nine digits. To make this possible, a series of accumulating condensers 210, 220 and 230 has been provided to which are applied, simultaneously, unit charges corresponding in number to the impulses received from the photocell 28. These condensers may conveniently be so related in size or the factors of the discharge circuit may be so adjusted that the condenser 210 will discharge after receiving ten such charges, the condenser 220 will discharge after receiving one hundred unit charges, and the condenser 230 after receiving one thousand charges. This presupposes that a three-digit counting system will be sufficient to measure a desired count and that less than one thousand impulses will be received in so doing. For larger counts, it will only be necessary to provide further accumulating condensers and to associate with each of these a counter and cooperating circuits similar to those which will later be described. Each of the two condensers 210 and 220 will be discharged many times during the counting process and if we assume, for the sake of an example, that the final count is 984, then, at the completion of the count the condenser 210, having been filled and discharged ninety-eight times, will contain four units, the condenser 220, having been filled and discharged nine times, will contain eighty-four units, and the condenser 230 will contain nine hundred eighty-four units. In general then, the counters associated with these accumulating condensers will, on the discharge of them by throwing an operator-controlled gang switch 212 having a single operating member indicated by a dotted line, register the numbers nine, eight, and four. Then, after the reading of these figure wheels, the switch 212 may be returned to its initial position, the figure wheels reset and the apparatus put in condition for another counting operation.

Inasmuch as the impulses received from the photocell 28 are inherently weak, there have been associated with this cell one or more amplifying circuits such as the circuit A, of usual arrangement, in which the impulses of the photocell are delivered to the grid of a triode 214 the plate of which is connected to a resistance load 216. The change in voltage drop across this resistance 216, whenever an impulse is received from the photocell, is utilized to deliver an amplified impulse to operate the novel electrical counter or register. A trigger or charging circuit C is associated with the accumulating condenser 210. Since the circuits associated with this and with the other accumulating condensers 220 and 230 are arranged to operate upon the same principle and differ only in electrical constants, the description will be restricted to one of these.

This charging circuit C is arranged as a conventional saw-tooth oscillator circuit employing a gas-filled arc-discharge tube 218, such as the argon-type tube #885 manufactured by the RCA Manufacturing Company, Inc. That this is a gas-filled arc-discharge tube is indicated conventionally in the drawings by the inclusion of a dot within the circle. An arc-discharge tube of this type has a very low plate resistance when in the conducting state. If the grid is sufficiently negative, no plate current will flow but as soon as the grid potential is raised, i. e., rendered less negative, beyond a certain point, a gaseous discharge occurs and the grid loses control. Connected between the plate and the filament or the anode and cathode of this tube 218, are three parallel circuits, one of which includes a source of power, such as the battery 222 and its adjustable limiting resistance 224, another of which comprises a condenser 226, and another of which includes the accumulating condenser 210 connected to the plate circuit at the point 232 through a limiting resistance 234, a condenser 236, and a diode 238 operating as a one-way valve. The grid of the tube 218 is given a negative bias by a device 228 which is adjusted to give this bias such a value that the tube will not fire or become conductive until an additional impulse is received from the impulse-delivering circuit A. The connection between these two circuits A and C is such that the change in voltage drop in the resistance 216, as a flash is received by the photocell, renders the grid of the tube 218 slightly more positive and causes it to fire and become conductive. Thereafter, a drop in the plate potential for only a few microseconds will be sufficient to stop the discharge of the tube, and the circuit will return to initial condition ready for a succeeding impulse. It will be understood that the time for each cycle of this trigger or charging circuit C must be a little less than the time between the successive impulses received from the photocell 28. Consistently with the name "saw-tooth oscillator" applied to the charging circuit C, the output of the circuit has a wave characterized by a more or less uniform and slow rise of potential to its maximum and a rapid drop of potential to its minimum. It is during this relatively slow rise of potential that, assuming that, as each count is begun, the condenser 226 has previously been discharged to bring it back to a fixed charge which is not necessarily zero, a unit charge will be delivered from the source of power 222 to the condenser 210 and, incidentally, to the condenser 226. The action of the resistance 234 is to limit the charging rate of this accumulating condenser 210. The condenser 236 prevents a continued charging from the source 222 when no impulses are to be counted. The diode 238 prevents a reverse flow from the accumulating condenser 210 when the potential at the point 232 starts to fall. Between impulses from the circuit A, the potential at the point 232 will have been brought by the source 222 to a value slightly less than that necessary to cause the tube to fire and become conductive. If, then, an impulse is received from the circuit A, the negative grid bias is reduced, i. e., made more positive, and the tube 218 becomes conductive, permitting the condenser 226 to discharge through the anode-cathode circuit of the tube. The accumulating condenser 210, however, cannot discharge through this circuit because of the one-way valve afforded by the tube 238. As the condenser 226 discharges, there will be a drop of potential at the point 232 and, when it reaches a point below the de-ionizing potential of the gas in the tube 218, the grid of the latter will regain control and render the tube non-conductive. Thus, for every impulse received from the photocell 28, there will be a triggering of the tube 218, making it conductive, alternated with the delivery of a unit charge to the accumulating condenser 210.

A somewhat simplified arrangement, constituting an alternative charging circuit C', is illustrated in Fig. 2 in which a tube 318, which may be of the same type as the tube 218, is given a negative grid bias by a device 328 and has connected across its anode-cathode circuit two parallel circuits, one of which includes a battery 322 and a resistance 324 while the other includes the accumulating condenser 210 connected through a one-way valve 338 and a resistance 334 to a point 332 corresponding to the point 232. It will be noted that the condensers 226 and 236 have been eliminated. Preferably, with this modified circuit the incoming impulses should successively be of the same order of magnitude, that is to say, should have the same maximum voltage, should occupy the same time interval, and should impart the same amount of energy. This circuit is adjusted, as by varying the grid bias, to a point where the tube 318 becomes conductive before the additional impulse is received from circuit A, and then the tube acts as an amplifier, with plate current varied as grid voltage is varied. The current in the plate circuit will be 180 degrees out of phase with the input current, as is true in every tube. Assuming then that the input impulses provide a pulsating current, the voltage at 332 will vary as a series of substantially uniform pulsations separate from one another and each in the same direction. The maximum value of this voltage will be lower than the battery voltage because of the drop in the resistance 324 due to the flow of plate current therein. Assuming a steady state when no impulses are being received, the accumulating condenser 210 will be charged by an amount determined by the voltage at the point 332 but no more charge will be received until an impulse from the photocell changes the grid voltage so as to decrease the plate current. With this decrease in current, the drop in the resistance 324 will be decreased and the voltage at the point 332 will become larger. At that time, the condenser 210 takes on an additional charge, but this charge will be limited in rate by the resistance 334. As a result, a charge is delivered to the condenser 210 during the first half of each pulsation of the voltage at 332. No current may flow backward from the condenser 210 because of the one-way valve 338 and, accordingly, the charge in the condenser 210 will remain constant (assuming no leakage) from the peak of one pulsation to the beginning of the next pulsation, whereupon one more charge is added to it.

Whenever, during this counting operation, the accumulating condenser 210 has received 10 unit charges, for example, provision is made for automatically discharging it in order that it shall be ready to count succeeding additional unit charges and, to this end, the apparatus is provided with a discharge circuit D employing a gas discharge tube 240 of a type the same as, or similar to that used in the charging circuit C. Assuming that the switch arms operated by the mechanism of the switch 212 have been moved to the points 241, 242, then it will be seen that one side of the condenser 210 is connected through a limiting resistance 244 to the plate or anode of the tube 240 and that the other side is connected to the cathode thereof. The grid of this tube is biased by a device 246 to such a value that the tube will become conductive whenever the ten unit charge as applied to the condenser 210 has raised the voltage thereon to a predetermined value. In the corresponding circuit associated with the accumulating condenser 220, the grid bias is so adjusted that the tube therein will only become conductive when one hundred unit charges have been received by that condenser, and, in the case of the condenser 230, a thousand unit charge would be necessary before the latter would discharge itself automatically.

Associated with each discharge circuit D is a frame 400 having rotatably mounted thereon a figure wheel 250 of a common type having a reference pointer 251, a return spring 252, a ratchet 254, an advancing pawl 256, and a retaining pawl 258. The advancing pawl 256 is arranged to be moved by the operating coil of an electro-magnet 260 and can also be raised both to free itself and to cam off the retaining pawl 258, by means of a resetting magnet 262. In series with the advancing magnet 260 is a condenser 264 and a resistance 268. At the completion of the counting operation, the operator will throw the switch 212 to bring the associated switch arms into the position shown in the drawings, across the terminals 243 and 245 of the resistance 268, thereby completing a registering sub-circuit. It will be recalled that at this time the condenser 230 contains the total number of unit charges received (assumed here to be less than one thousand) while the condenser 220 has a residual charge corresponding to the tens and units digits, and the condenser 210, a residual charge corresponding to the unit digit of the measured count. The transference of the residual charge on condenser 210 to the figure wheel magnet 260 is effected, unit by unit, by bringing this accumulating condenser 210 into a saw-tooth or relaxation oscillator circuit including the electro-magnet 260, the condenser 264 and the resistance 268, serving as a counting or a registering sub-circuit. The accumulating condenser 210 will then act as a source of voltage and the constants of the circuit will have been so adjusted, such as by adjustment of the grid bias on tube 240 by movement of the arm 245 of the potentiometer 246, that one unit charge transferred from the condenser 210 is sufficient to trigger the circuit by raising the plate or anode voltage of the tube 240 to a point where it fires and becomes conductive. This discharge period will be accompanied by a flow of current into the condenser 264 which will energize the coil of the advancing magnet 260 and move the figure wheel 250 a step to bring the next number into view. Succeeding oscillations set up in this saw-tooth circuit will provide pulsations of current slow enough to operate the counter 250. The periodicity of this registering operation is entirely independent of that of the counting operation and follows termination of the latter. If needed, one or more amplifier circuits may be interposed between the counting circuit and the coil of the mechanical register. As in the case of the charging circuit C, however, the condenser 264 will immediately discharge when its oscillator circuit reaches a predetermined maximum voltage and the tube 240 fires, and this discharge will be accompanied by a regaining of control of the tube 240 by its grid, the delivery of an additional impulse from the condenser 210 to the condenser 264 and so on until the unit charges on that condenser, 210, have been counted. It will be understood that at the same time the discharge circuit associated with the accumulating condenser 220 is oscillating and moving its figure wheel eight times (under the continued assumption that the count to be measured is nine hundred eighty-four), ignoring the residual four charges which are too small to move this particular figure wheel and, similarly, the discharge of the condenser 230 will move its figure wheel nine notches, ignoring the residual eighty-four charges. The figure wheels will then carry the resultant count. The switch 212 may then be returned to a position on the contacts 241, 242, ready for the next measurement. An operator-controlled switch, indicated diagrammatically at 263, will be utilized momentarily to energize the reset magnets 262, allowing the springs 252 to return the figure wheels to their initial position. Other parts 265 and 267 of such a switch will be utilized momentarily to short-circuit the accumulating condensers 220 and 230 so as to remove therefrom, for example, the residual eighty-four and four units respectively, thus leaving the apparatus in condition for the counting of the impulses received from the photocell tube 28 in another measurement. A spring 269 may be used to hold these switches normally in open position.

When the invention is to be utilized in connection with an area measuring machine of the type in which the light impulses received by the photocell 28 depend upon the absence, at a particular point, of an article to be measured, then it is necessary to subtract the count which has been made from a constant corresponding to the area of the work-receiving surface of the machine, only a portion of which is covered by the article to be measured. Such a machine is described in my copending application, Serial No. 408,228, filed August 25, 1941, for improvements in Area measuring machines, and, while it will be understood that the constant is arbitrary and dependent upon the design of the machine, the one therein utilized is the number 3,000.

Figure 3:
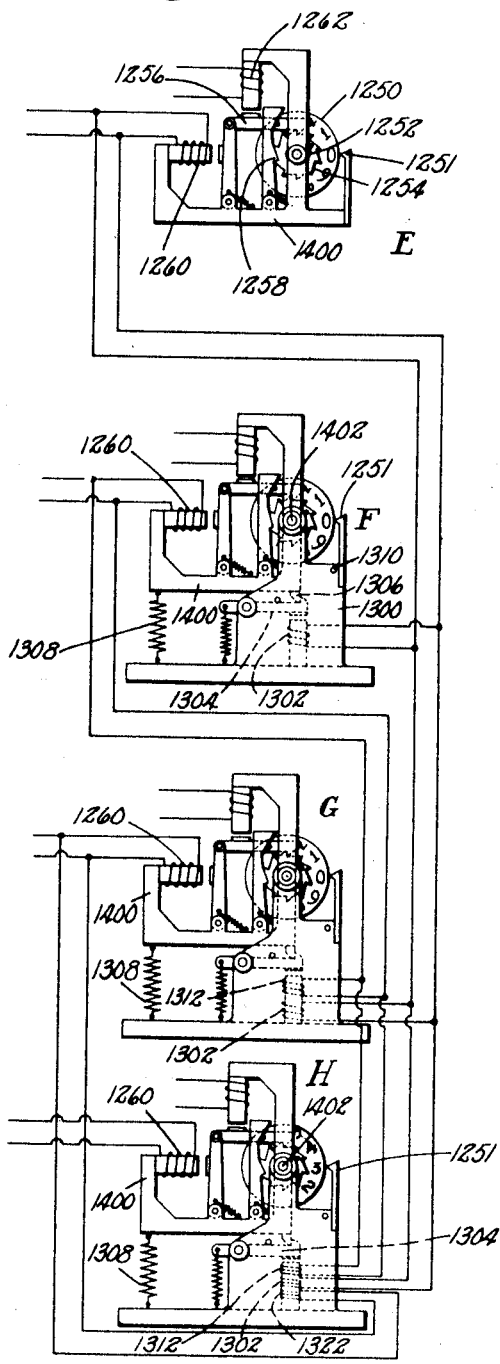
Fig. 3 shows diagrammatically a direct-reading counter mechanism where the count which is made is to be subtracted from a constant, to wit, the number 3,000.

To make the counters of such a machine direct reading, it is possible to utilize a modified apparatus, shown in Fig. 3, in which the figure wheels 1250 are numbered backwards and are provided with a special correcting device to be described. In this figure, the parts which correspond to those shown in Fig. 1 have been given numerals in which 1,000 has been added to the numerals of Fig. 1. Inasmuch as the constant is more than one thousand, it will be necessary to provide the apparatus of Fig. 1 with another counting circuit which will be a duplicate of those shown except that it will be provided with an accumulating condenser having a sufficient capacity and provided with a discharge circuit D so adjusted that it will not be discharged automatically until 10,000 unit charges have been received. This circuit will be connected directly to the operating electro-magnet 1260 of a counter H. At the same time, counters E, F and G will be substituted for the three counters shown in Fig. 1, and, of these, the counter E will be the same as is therein shown save only that the number wheel 1250 is numbered in the reverse direction from that shown in Fig. 1. In the counters F, G and H, however, the frames 1400 are pivotally mounted at 1402 upon a base 1300 in which there is provided a correcting coil 1302 of an electro-magnet, and the action of this coil is similar to the mechanical carry-over utilized in mechanically interconnected counters. When this coil 1302 is energized, it draws down a latch 1304 engaging a projection 1306 and allows the whole frame 1400 to be drawn down by a spring 1308, thereby tilting the frame 1400 until the projection 1306 strikes a stop pin 1310. This angular tilting movement of the frame 1400 is sufficient to carry the next number on the figure wheel 1250 to a position opposite the reference pointer 1251, thus in effect subtracting 1 from the digit to be read on the figure wheel and corresponding in effect to a movement of the reference pointer 1251 a distance equal to the space between successive digits. It will be observed that the return spring 1252 on the counters E, F and G is arranged to return these figure wheels to zero after the count has been taken. On the other hand, the corresponding spring on the counter H is arranged to return its figure wheel to the number 3 for the reason that the impulses received are to be subtracted from the constant 3,000. In the counter G, there has been provided both the correcting coil 1302, and, in addition, a coacting and additional coil 1312 has been provided. In the counter H, three correcting coils 1302, 1312 and 1322 are positioned on the same core and an impulse received by any one of the three is sufficient to release the latch 1304 and to permit the tilting of the corresponding frame 1400 to bring the figure 2 opposite the pointer 1251.

The principle of the corrective action of these coils depends upon the fact that the number which is to be subtracted from the constant 3,000 may vary from 1 to 2,999 and the arrangement is such that, when any of the digits in that counted figure which is to be subtracted is a finite number other than zero, then all the digits to be read at the left of it must be corrected by subtracting 1. In Fig. 3, the counters E, F, G and H are arranged one above the other to make the figure correspond to Fig. 1 and so that the operating magnets 1260 may obviously be connected to the corresponding circuits D. The final result to be read from the figure wheels will be read from the figure wheels in the counters H, G, F, E, from bottom to top.

In accordance with this principle, the coils 1302 in the counters F, G and H are connected to the circuit which energizes the electro-magnet 1260 of the counter E so that a correction of one will be made whenever the number recorded by counter E is one or more than one. Similarly, the coils 1312 are connected to the circuit which energizes the magnet 1260 of the counter F, and the remaining coil 1322 in the counter H is connected to the energizing circuit from a magnet 1260 in the counter G. When no impulses are received in any one of the counters E, F and G, the corresponding correcting coils 1302, 1312 and 1322 will not be energized. On the other hand, the action of these coils is additive so that the energization of any one of them is sufficient to release the latch 1304 of the counters below it which will correspond to the figures to the left of this digit in the final result.

Figure 4:
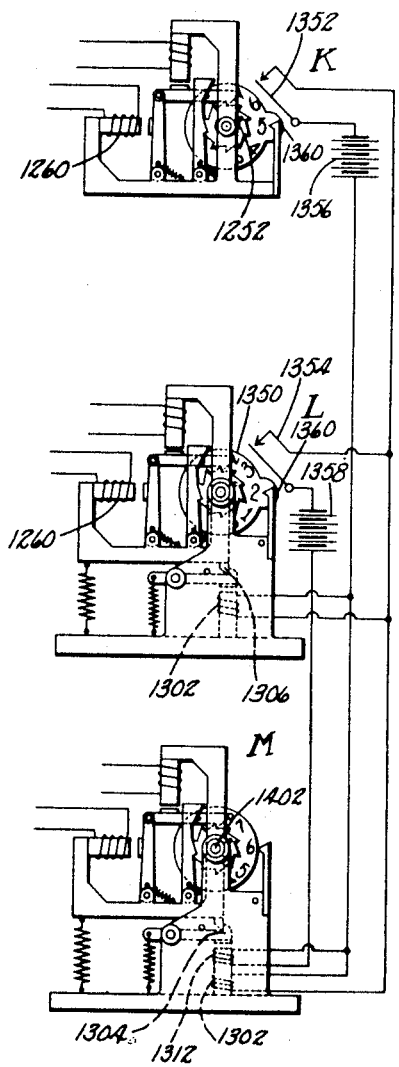
Fig. 4 is a similar diagrammatic showing of an arrangement in which the count which is made is subtracted from a constant, to wit, the number 625.

It may be desired to provide direct reading counters where the number of impulses which has been counted in an area measuring machine is to be subtracted from a constant such as the number 625 where all the digits are finite figures other than zero. An arrangement is then employed which is illustrated in Fig. 4 where counters K, L and M have figure wheels 1350 which are provided with cams 1360 opposite the numbers 2 and 5 on the counters L and K corresponding to the digits 2 and 5 of the constant 625. These cams are arranged to close switches 1352 and 1354, thereby to energize coils 1302 and 1312, respectively, whenever a unit charge is received by the actuating magnets 1260 of the counters K and L, respectively. For convenience, local sources, such as the batteries 1356 and 1358, have been provided in the circuits of these switches. Except for the arrangement of these correcting cams and switches and the fact that the figure wheels 1360 of the counters M, L and K are arranged to be returned to the figures 6, 2 and 5, the counters K, L and M are like the counters E, F and G.

Having thus described my invention, what I claim as new and desire to secure by Letters Patent of the United States is:

1. In a counter of input electrical impulses, a series of accumulator electrical condensers arranged in parallel circuits, input impulse-actuated control means for delivering simultaneously to said accumulators successive charges of electricity, the number of which is in direct proportion with a number which is being counted, means operative automatically for intermittently dissipating, between the receipt of successive impulses, the charge on at least one of said accumulator condensers as soon as it has received a predetermined number of charges, and operator-controlled means for subsequently measuring and registering the residual charges contained in said accumulator condensers.

2. In a counter-operating device, an accumulating condenser arranged to receive successive charges, a step-by-step counter, a coil for operating said counter, a circuit comprising an arc-discharge tube adapted to be triggered by an accumulated charge on said condenser when said charge has reached a predetermined maximum, to remove the charge from said condenser, another circuit for operating said counter, to register thereon the number of units in a residual charge, less than said maximum, stored in the accumulating condenser, said latter circuit including said tube, said coil and a condenser for receiving and discharging unit portions of said residual charge, and a switch for shifting from one circuit to the other.

3. In a counter-operating device, a counter, an accumulating condenser arranged to receive successive charges, a grid-biased arc-discharge tube having an element connected to one side of said condenser, a resistance between an element of the tube and said condenser, a counter-operating coil and a condenser in series adapted to bridge the anode and cathode of the tube to complete a saw-tooth oscillator circuit, and switch means to close the latter circuit, whereby, upon adjustment of the grid bias, the charge on the condenser will be converted to an oscillatory current the pulsations of which are passed through said counter-operating coil to operate said counter.

4. In a register-operating device, a series of parallel circuits, a photocell adapted to be intermittently activated to deliver a number of successive impulses substantially simultaneously to all of said circuits, each of the circuits of said series having an accumulating condenser, a charging circuit, a discharge circuit, a visual register and a switch to include said register, said charging circuits being rendered operative by the impulses from the photocell to deliver to all the condensers a series of unit charges proportionate to the number of impulses, said discharge circuits being arranged, upon operation of the switch to exclude the registering device, for automatically discharging the accumulating condensers when their charges reach values having a predetermined ratio in the successive circuits and for alternatively, later, upon operation of the switch to include the registering devices, causing the latter to give readings indicating the sizes of the residual charges on said accumulating condensers.

5. In a counter, a series of accumulating condensers arranged in parallel circuits, impulse-producing means for delivering simultaneously to said condensers, through said circuits, successive unit charges of electricity the number of which is in direct proportion with a number which is being counted, and discharge circuits associated with the respective condensers operative to remove therefrom the charges as soon as they reach predetermined quantities, said quantities in the successive discharge circuits having a decimal ratio to each other, whereby the residual charges in said condensers will, when measured, represent the digits of the number counted.

6. In a counter, a series of accumulating condensers arranged in parallel circuits, impulse-producing means for delivering simultaneously to said condensers successive unit charges of electricity the number of which is in direct proportion with a number which is being counted, and discharge circuits, each including an arc-discharge device and a condenser, associated with said accumulating condensers and having their component units adjusted intermittently to remove the charges received by the respective accumulating condensers of the series at different rates having a decimal ratio, the residual charges on said condensers, received after said removal, representing the units, tens and hundreds digits of the total number.

PHILIP E. NOKES.